Feb. 17, 1931. R. O. OAKLEY 1,792,656
CALKING AND GLAZING MACHINE
Filed Aug. 13, 1927 3 Sheets-Sheet 3
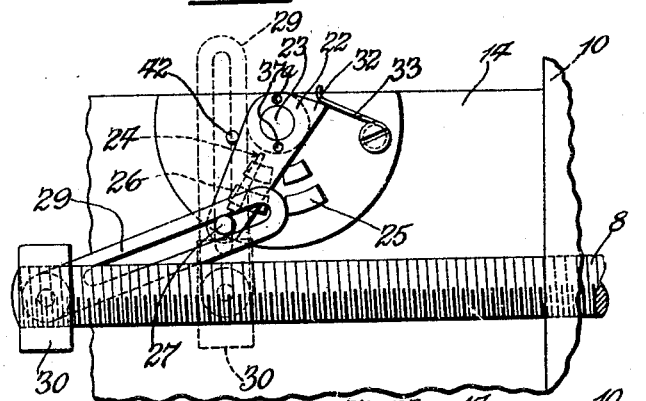
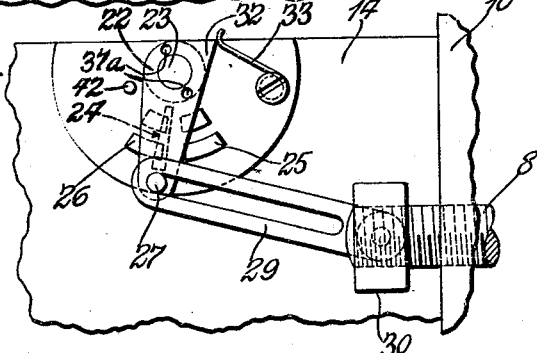
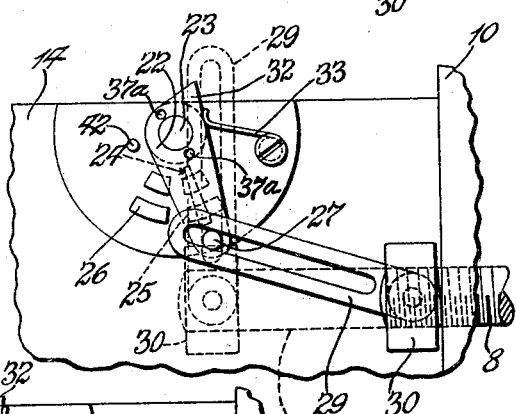
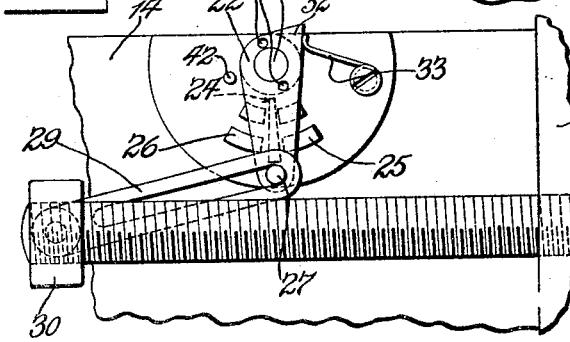
Inventor:
Richard O. Oakley,
by Henry Kinealy
His Attorney.

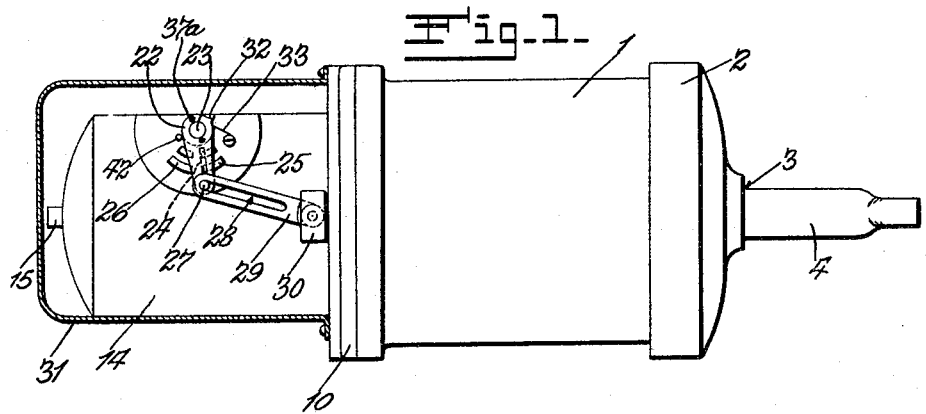

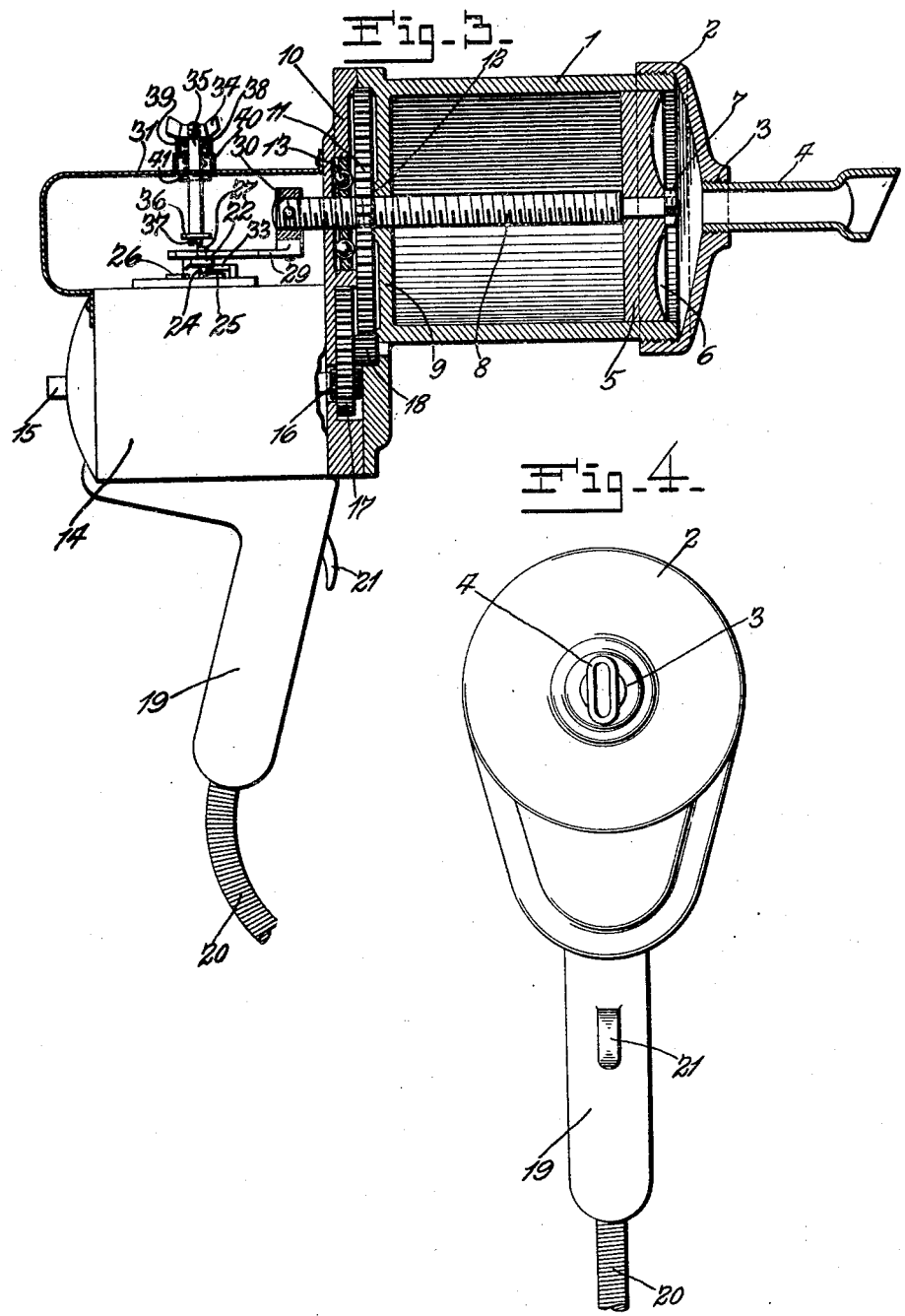

Patented Feb. 17, 1931

1,792,656

UNITED STATES PATENT OFFICE

RICHARD O. OAKLEY, OF ST. LOUIS, MISSOURI

CALKING AND GLAZING MACHINE

Application filed August 13, 1927. Serial No. 212,821.

My invention relates to calking and glazing machines, and more particularly to calking and glazing machines which are used to apply plastic compound of different kinds to fill up the cracks, or crevices between the sides of windows, doors and other openings and the contiguous parts of the adjacent walls and, likewise, which are used to apply putty in glazing.

Heretofore, devices of this kind have usually utilized compressed air or other fluid to force the plastic compound from the calking or glazing machine, and the use of such compressed fluid rendered the machine heavy and unwieldy since a bulky compressor and supply tanks for the fluid were required. When calking and glazing were done on buildings it was necessary to transport this bulky mechanism from one point to another as different jobs were worked on and completed, and such transportation of the mechanism necessarily involved much time and effort.

Some attempts have been made to design a machine of this type in which a motor was arranged to exert pressure to force the plastic compound from the cylinder of the machine but these attempts have been failures. Usually the machine forced the compound out too fast, the operator did not have complete control over the machine, or if the operator continued to operate the machine after all of the compound had been expelled from the cylinder serious damage to the machine would result.

The objects of my invention are to provide a calking or glazing machine which includes a motor arranged to exert pressure to force the plastic compound from the machine, which is included as a unit in the machine and which utilizes as its motive power electricity or some other easily obtainable source of energy; to provide a calking machine which is a manually supportable and operable unitary structure and which may be quickly and easily transported from one point to another; and to provide such a machine which will be foolproof and cannot be harmed by the operator continuing the operation of the motor after all of the plastic compound has been forced from the machine.

One form of device embodying my invention is clearly shown in the accompanying drawings wherein similar characters are used to designate similar parts. Fig. 1 is a top view, partly in section of the device; Fig. 2 is a side view, partly in section as in Fig. 1; Fig. 3 is a side view showing in section the actuating mechanism for the piston; Fig. 4 is a front view of the device; and Figs. 5, 6, 7 and 8 show details of construction.

Referring to the figures, the embodiment shown has a cylinder 1 which is adapted to be filled with a plastic compound and which has, preferably, threaded on its front end a cap 2 having a suitable orifice 3 in which is mounted a discharge tube 4 through which the plastic compound is forced from the cylinder. I prefer, and especially where the machine is to be used for glazing, that the outer end of the tube 4 be somewhat flattened, as shown in the figures. A piston 5 is mounted so as to be slidable in the cylinder and I prefer that the outer face of the piston, that is, the face which is in contact with the plastic material in the cylinder, be shaped to provide a channel 6, the bottom of which is arcuate in shape so that the outer marginal surface thereof meets the cylinder wall at an angle less than a right angle, as shown in Fig. 3, for the purpose more fully hereinafter explained. The piston 5 is fixed by any suitable means such as the nut 7 onto the end of a piston rod 8 which is, preferably, threaded throughout substantially its entire length and which extends, in this embodiment of my invention, through the rear wall 9 of the cylinder.

At the rear of the cylinder 1 is a suitable housing 10 which is formed and arranged to provide a hollow space within which are mounted the various parts now to be described. A disk 11 having the periphery thereof provided with teeth, is threaded on the piston rod 8 and is maintained in fixed longitudinal position relative to the cylinder 1 by the shoulder 12, formed on the back of the rear wall 9 of the cylinder, and a thrust bearing 13 which is positioned between the wall of the housing 10 and the other face of the disk 11. A motor 14, operated from any suitable source of energy, in this embodiment being operated by electricity, and arranged to operate to rotate the motor-shaft 15 in both directions, is carried behind and slightly below the cylinder 1. The motor-shaft 15 is in operative connection with the disk 11 through suitable reduction gearing which, in this form of my device, includes a pinion 16 mounted on the inner end of the motor-shaft 15, a spur-gear 17 meshing with the pinion and a driving pinion 18 fixed on the face of the spur-gear 17 and in mesh with the teeth on the periphery of the disk 11. It will be seen that when the motor 14 operates to rotate the motor-shaft 15 in one direction the disk 11 will be rotated comparatively slowly and, since the disk 11 is maintained in fixed longitudinal relation to the cylinder 1 and since the disk is threaded on the piston rod 8 the piston rod and the piston 5 will be moved longitudinally forward in the cylinder. Likewise, when the motor-shaft 15 rotates in the other direction the disk 11 will be rotated in a reverse direction and the movement of the piston rod 8 and piston 5 will be reversed and they will be moved rearwardly in the cylinder. Extending downwardly from the lower part of the machine is a handle 19 into the bottom of which leads the wire 20 from any suitable and convenient source of electricity. On the front of the handle and, preferably, at a point convenient to the operator's index finger is a trigger switch 21 arranged so that when it is depressed electricity will flow to actuate the motor and when it is released the electricity will be cut off and the motor will stop.

If a device embodying my invention comprises only the elements which have been enumerated above such device will be workable and will be satisfactory in the hands of a skilled operator, but often the machines may be used by unskilled workmen and these workmen would not notice when the piston 5 has reached the end of the cylinder and has expelled all of the plastic compound therefrom, and if the operation of the motor is allowed to continue to move the piston 5 forwardly after it has reached the end of the cylinder, the piston will bear against the cap 2 and enough pressure might be exerted to force the cap from the end of the cylinder and otherwise damage the machine. To obviate this possibility I prefer to provide an automatic reversing switch for the motor and which switch is controlled by the movement of the piston in the cylinder. This switch is shown in detail in Figs. 5 to 8, inclusive, of the drawings and is constructed as follows: A switch bar 22, preferably made of some non-conducting material, is swingably mounted on the pin 23 and the bar has on its under side a strip 24 of copper or other material which will conduct electricity. In the base of the switch are two sets of contact points 25 and 26, respectively, which are connected to the motor and which are arranged so that when the contact points 25 are connected by the strip 24 the motor will be operated to rotate the motor-shaft 15 in a direction to move the piston rearwardly in the cylinder, and when the contact points 26 are connected by the strip 24 the motor will be operated to rotate the motor-shaft 15 in a reverse direction to move the piston forwardly in the cylinder. On the outer end of the switch bar 22 is an upwardly extending lug 27 which is loosely mounted in the slot 28 formed in the link 29 pivotally mounted on a block 30 fixed to the rear end of the piston rod 8. The base of the switch bar 22 has arranged thereon the shoulder 32 adapted to move against a spring 33 in the manner and for the purpose more fully explained below. The switch is covered by a suitable shield 31 shown in Figs. 1 and 2.

In order that the switch may be manually moved, for the purposes hereinafter fully explained, I prefer that a winged button 34 be positioned on the upper end of the rod 35 above the top of the shield 31. The lower end of the rod 35 is provided with the plate 36 which has the downwardly extending pins 37 adapted to engage in holes 37ª in the base of the switch bar 22. In order that the button may not at all times be connected with the switch bar and in order that the plate 36 may be raised away from the bar 22 so as not to interfere with the movement of the link 29, as hereinafter explained, I prefer that a spring 38 be provided which, acting against the underside of the cup 39 and within the cylinder 40 will normally hold the plate 36 away from the bar 22. A key 41 is arranged to act against the lower side of the shield 31 to limit the upward movement of the bar.

The operation of the calking and glazing machine described above as embodying my invention is as follows: With the piston at the end of its rearward stroke in which position it will be close to the rear wall of the cylinder, the cap 2 is unscrewed from the forward end of the cylinder and the cylinder is filled with the desired plastic compound. The operator then by means of the button 34 moves the switch bar 22 into the position shown by the full lines in Fig. 5 in which position the strip 24 will connect the contact points 26. He will be prevented from moving the switch to connect the contact points 25 because if this is attempted the pin 27 will contact with the outer end of the slot 28 and further movement of the switch bar towards the contact points 25 to connect them will be prevented. A stop 42 may be provided to prevent the switch bar from being moved too far to carry the strip 24 past and out of contact with the contact points 26.

Then the operator, holding the machine in his hands in the position so that the compound expelled from the tube 4 will be emitted at the proper place presses the trigger 21 to start the operation of the motor 14. Since, as described above, the switch bar 22 has been moved to connect the contact points 26 the motor will operate to rotate the motor-shaft 15 in a direction to move the piston 5 forwardly in the cylinder. As the piston 5 moves forwardly in the cylinder the plastic compound will be forced therefrom and be expelled through the tube 4 and, since as described above, the marginal surface of the piston 5 preferably meets the wall of the cylinder at an angle less than a right angle it will have a scraping or shearing action to remove all of the compound from the cylinder wall and to tend to move the compound towards the center of the cylinder. Furthermore, since the reduction gearing makes the disk rotate comparatively slowly, the piston, in turn, will be moved very slowly in comparison to the speed of the motor and the compound will not be expelled too rapidly. As the piston rod 8 moves forwardly with the piston 5 it will carry the block 30 with it and the link 29 will be moved into the position shown in the dotted lines in Fig. 5. As the piston approaches the end of its forward stroke, the link 29 will be in the position shown in Fig. 6 and the outer end of the slot 28 in the link 29 will be in engagement with the lug 27 and as the piston moves still farther forward the end of the slot 28 in engagement with the lug 27 will move the switch bar 22 to move the spring 33 on the shoulder 32. When the end of the stroke has been reached the switch bar 22 will have been moved to bring the apex of the shoulder 32 past the spring 33 and the action of the spring 33 against the shoulder will move the switch bar 22 into the position shown in Fig. 7 in which position the strip 24 will connect the contact points 25. Of course, as this movement of the switch bar by the action of the spring 33 is taking place and while the strip 24 is in the space between the adjacent ends of the contact points 25 and 26 the motor will momentarily stop and then when the switch bar 22 is moved still further by the action of the spring 33 against the shoulder 32 to connect the contact points 25 the operation of the motor will be changed to rotate the shaft 15 in this reverse direction and as the rotation of the shaft 15 in this reverse direction continues the piston 5 will be moved rearwardly in the cylinder. As the piston 5 approaches the end of its rearward stroke the outer end of the slot 28 will again engage the lug 27 and as the rearward movement of the piston continues the switch bar 22 will be moved with the link and when the piston has reached the end of its rearward stroke the bar 22 will have been moved in the position shown in Fig. 8 in which position the strip 24 will be out of contact with the contact points 25 and will be in the space between the adjacent ends of the contact points 25 and 26 and the operation of the motor will be stopped. The rearward movement of the piston will, of course, continue until the strip 24 has been carried out of contact with the contact points 25.

What I claim as new and desire to secure by Letters Patent, is:—

1. The combination with a manually supportable and operable calking machine having a cylinder, a piston slidably mounted in said cylinder, a motor, an operating connection between said motor and said piston arranged whereby when said motor is operated said piston will be moved in said cylinder, of automatic mechanism controlled by the movement of said piston whereby the operation of said motor to continue to move said piston in one direction will be stopped automatically when said piston reaches the end of its stroke in that direction.

2. The combination with a manually supportable and operable calking machine having a cylinder, a piston slidably mounted in said cylinder, a motor, and operating connection between said motor and said piston arranged whereby when said motor is operated said piston will be moved forwardly in said cylinder, of automatic mechanism controlled by the movement of said piston whereby when said piston reaches the end of its forward stroke the forward movement of said piston will be stopped automatically.

3. The combination with a manually supportable and operable calking machine having a cylinder, a piston slidably mounted in said cylinder, a motor, an operating connection between said motor and said piston arranged whereby when said motor is operated said piston will be moved forwardly and rearwardly in said cylinder, of automatic mechanism controlled by the movement of said piston whereby when said piston reaches the end of its forward stroke the movement thereof will be reversed.

4. The combination with a manually supportable and operable calking machine having a cylinder, a piston slidably mounted in said cylinder, a motor adapted and arranged to be operated to rotate the motor-shaft thereof in both directions, an operating connection between said motor-shaft and said piston arranged whereby when said shaft rotates in one direction said piston will be moved forwardly in said cylinder and when said shaft rotates in the other direction said piston will be moved rearwardly in said cylinder, of automatic mechanism controlled by the movement of said piston for reversing the direction of rotation of said shaft when said piston reaches the end of its forward stroke.

5. The combination with a manually supportable and operable calking machine having a cylinder, a piston slidably mounted in said cylinder, an electric motor, an operative connection between said motor and said piston arranged whereby when said motor is operated said piston will be moved in said cylinder, a switch for said motor, of automatic mechanism controlled by the movement of said piston for automatically moving said switch to stop the rotation of said motor to continue to move said piston in one direction when the piston reaches the end of its stroke in that direction.

6. The combination with a manually supportable and operable calking machine having a cylinder, a piston slidably mounted in said cylinder, an electric motor adapted to be operated to rotate the motor-shaft thereof in both directions, an operative connection between said motor and said piston arranged whereby when said motor-shaft rotates in one direction said piston will be moved forwardly and when said shaft rotates in the other direction said piston will be moved rearwardly in said cylinder, a switch for reversing the direction of rotation of said shaft, of automatic mechanism controlled by the movement of said piston for moving said switch to reverse the direction of rotation of said shaft when said piston reaches the end of its forward stroke.

7. A manually supportable and operable calking machine comprising a casing containing a cylinder, a piston slidably mounted in said cylinder, a piston rod extending rearwardly from said piston, a disk threaded on said piston rod, means for maintaining said disk in fixed longitudinal position relative to said cylinder, a motor, and an operative connection between said motor and said disk arranged whereby when said motor rotates said disk will be rotated to move said piston rod and said piston longitudinally in said cylinder.

8. A manually supportable and operable calking machine comprising a casing containing a cylinder, a piston slidably mounted in said cylinder, a piston rod extending rearwardly from said piston, a disk threaded on said piston rod, the outer periphery of said disk having teeth formed thereon, means for maintaining said disk in fixed longitudinal position relative to said cylinder, a motor, a motor-shaft, reduction gearing between said motor-shaft and said disk whereby when said shaft rotates said disk will be rotated comparatively slowly to move said piston rod and said piston longitudinally in said cylinder.

9. A manually supportable and operable calking machine comprising a casing containing a cylinder, a piston slidably mounted in said cylinder, a piston rod extending rearwardly from said piston, a disk threaded on said piston rod, means for maintaining said disk in fixed longitudinal position relative to said cylinder, a motor adapted to operate in both directions, an operative connection between said motor and said disk arranged whereby when said motor operates in one direction said piston and said piston rod will be moved forwardly in said cylinder and when said motor operates in the other direction said piston rod and said piston will be moved rearwardly in said cylinder.

10. The combination with a manually supportable and operable calking machine comprising a casing containing a cylinder, a piston slidably mounted in said cylinder, a piston rod extending rearwardly from said piston, a disk threaded on said piston rod, means for maintaining said disk in fixed longitudinal position relative to said cylinder, a motor, a motor-shaft, an operative connection between said shaft and said disk arranged whereby when said shaft rotates in one direction said disk will be rotated to move said piston rod and said piston forwardly in said cylinder, of automatic mechanism means controlled by the movement of said piston whereby the operation of said motor to rotate said shaft to move said piston forwardly will be stopped when said piston reaches the end of its forward stroke.

11. The combination with a manually supportable and operable calking machine comprising a casing containing a cylinder, a piston slidably mounted in said cylinder, a piston rod extending rearwardly from said piston, a disk threaded on said piston rod, means for maintaining said disk in fixed longitudinal position relative to said cylinder, a motor adapted to operate to rotate the motor-shaft thereof in both directions, an operative connection between said shaft and said disk arranged whereby when said shaft rotates in one direction said piston and said piston rod will be moved forwardly in said cylinder and when said shaft rotates in the other direction said piston and said piston rod will be moved rearwardly in said cylinder, of automatic mechanism controlled by the movement of said piston whereby when said piston reaches the end of its forward stroke the operation of said motor will be changed to reverse the direction of said shaft to cause said piston to move rearwardly in said cylinder.

12. The combination with a calking machine having a cylinder, a piston slidably mounted in said cylinder, a piston rod extending rearwardly from said piston, an electric motor, an operative connection between said motor and said piston arranged whereby when said motor operates said piston will be moved in said cylinder, of automatic mechanism comprising a switch for said motor, and a link extending between said piston and said switch and arranged whereby when said piston reaches the end of its forward stroke said switch will be moved to stop the operation of said motor to continue to move said piston forwardly.

13. The combination with a calking machine comprising a cylinder, a piston slidably mounted in said cylinder, a piston rod extending rearwardly from said piston, a disk threaded on said piston, means for maintaining said disk in fixed longitudinal position relative to said cylinder, an electric motor adapted to operate to rotate the motor-shaft thereof in both directions, reduction gearing between said shaft and said disk arranged whereby when said shaft rotates in one direction said disk will be rotated comparatively slowly to move said piston and said piston rod forwardly in said cylinder, and when said shaft rotates in the other direction said disk will be rotated to move said piston and said piston rod rearwardly in said cylinder, of automatic mechanism comprising a switch for reversing the direction of operation of said motor, and a link extending between said piston rod and said switch and positioned and arranged whereby when said piston reaches the end of its forward stroke said switch will be moved to reverse the operation of said motor and move said piston rearwardly and when said piston reaches the end of its rearward stroke said switch will be moved to stop the operation of said motor to move said piston.

In witness whereof I have signed my name to the foregoing specification.

RICHARD O. OAKLEY.